July 14, 1931.  R. C. ALLEN  1,814,627
TURBINE SUPPORT
Filed Nov. 27, 1926  2 Sheets-Sheet 1
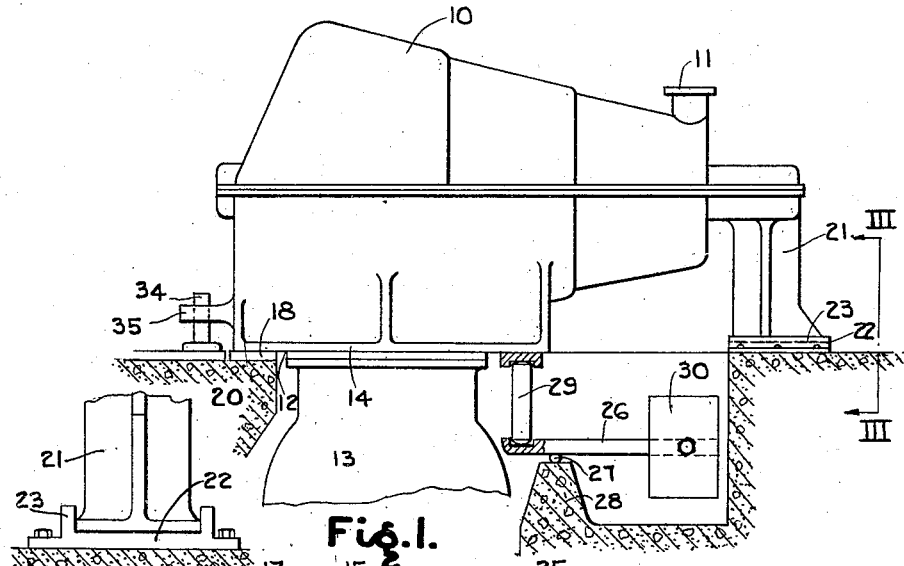
Fig.1.
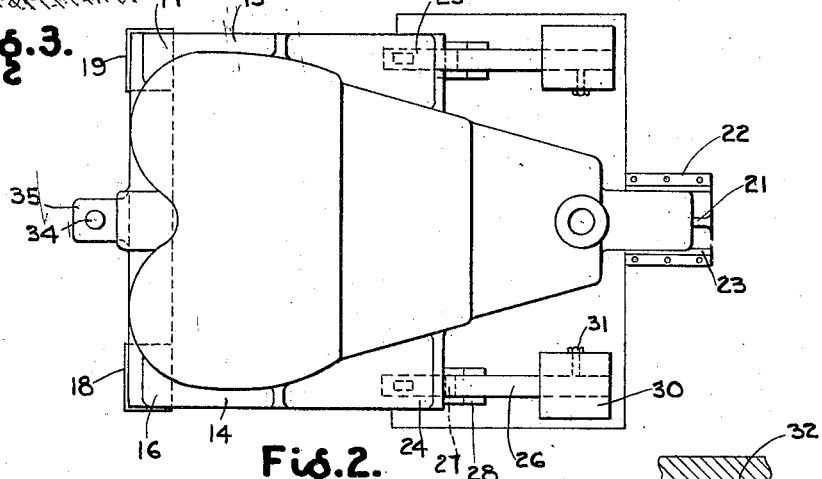
Fig.3.  Fig.2.
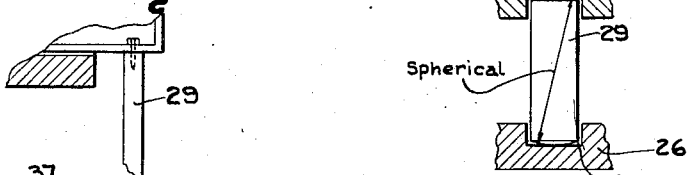
Fig.4. Spherical
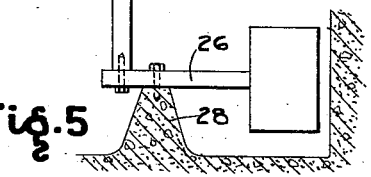
Fig.5.
WITNESS
E. Lutz
R.C.Allen
INVENTOR
BY A. B. Reavis
ATTORNEY

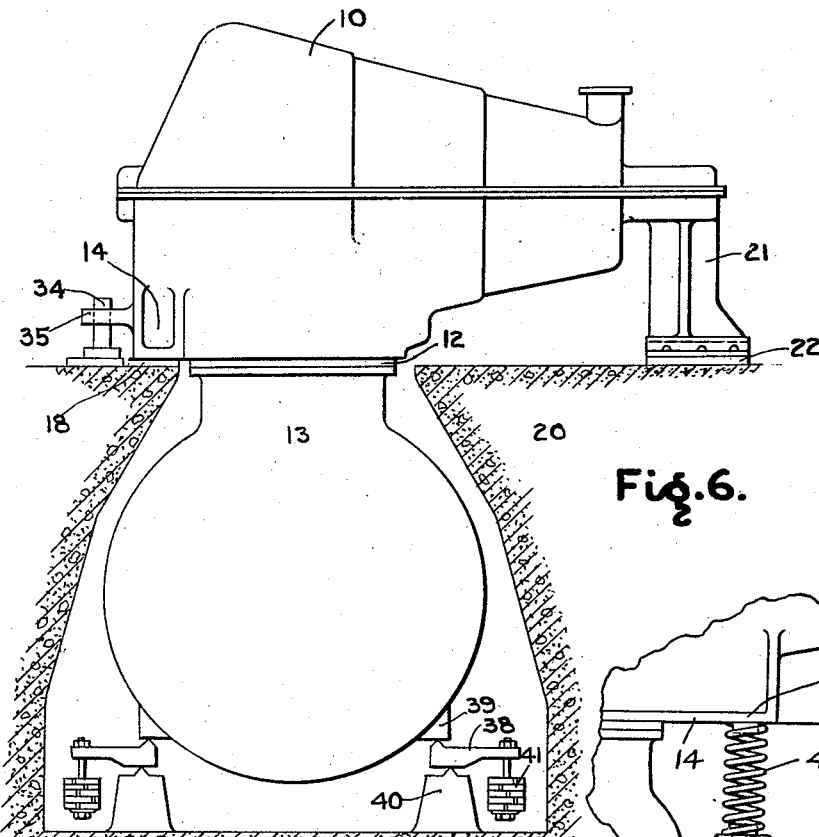
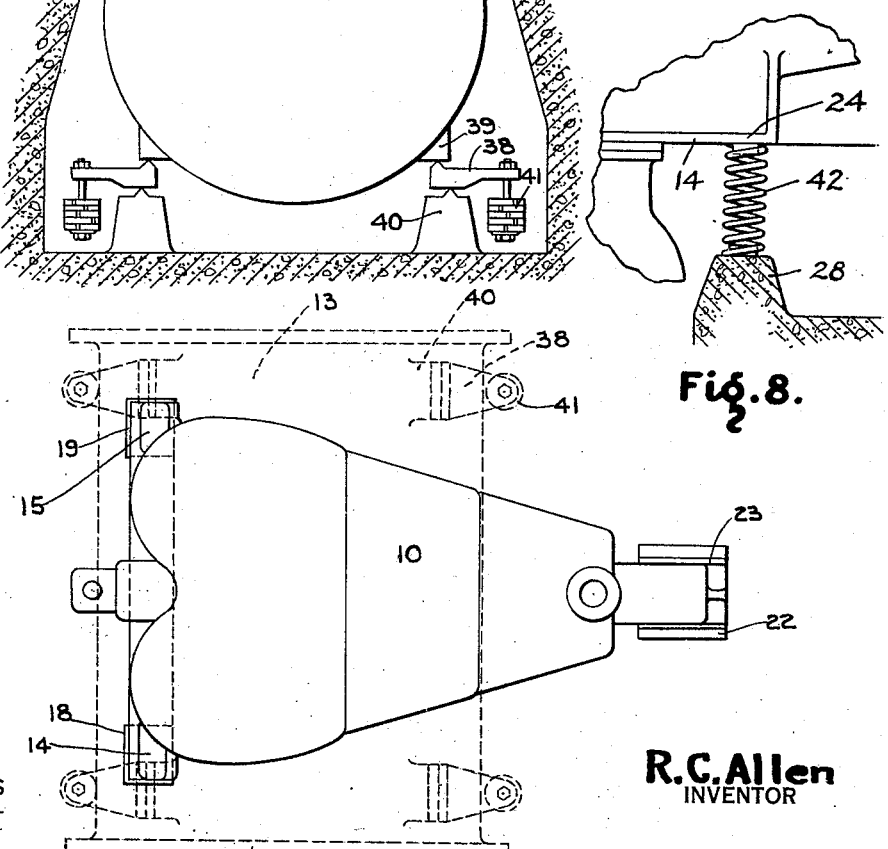

Patented July 14, 1931

1,814,627

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

TURBINE SUPPORT

Application filed November 27, 1926. Serial No. 151,153.

My invention relates to a supporting structure for the stationary structure of a machine, more especially to a supporting structure for the casing or cylinder structure of an elastic fluid turbine, and it has for an object to provide a supporting structure which will distribute the heavy load over a sufficient number of points on the foundation, and which will not distort the stationary structure or casing upon distortion of the foundation, due to settling or other variations in the relative positions of the supports or points of support in the supporting structure.

Another object is to provide a supporting structure of the character designated which is suitable for a condensing turbine in a power plant as commonly laid out, and which includes supporting means for the condenser permitting expansion thereof due to temperature changes.

In central station power plants, the casings are so heavy that it is common to support them at five or more points on the foundation. It will be apparent, however, that settling of the foundation, or other changes in the relative positions of the supports, will distort the casing. Distortion of the casing disturbs the blade clearances within the turbine, and disturbance of the blade clearances in turn causes rubbing of the parts where the clearances are reduced or taken up, and excessive leakage of motive fluid where the clearances are increased.

Distortion of the cylinder structure may be avoided by providing three rigid supports or points of support. If there is a change in the relative position of one support for any reason, the casing will turn about the other two points as a pivot, and as the distribution of the weight thereof is not changed, there will be no distortion of the casing. A three point supporting structure, however, presents the problem, above mentioned, of distributing the heavy load of the weight of the turbine over a sufficient number of points on the foundation. It also presents the objection of stresses within the casing due to the weight thereof being transmitted to the points of support.

In accordance with my invention, I provide three rigid supports and additional yielding supports to assume a portion of the load. In this way, I obtain the advantages of a three point support and provide a sufficient distribution of the weight of the turbine on the foundation. The three rigid supports determine the position of the cylinder structure, and the yielding supports increase the number of supports to relieve the excessive load on the fixed supports, and thereby provide a means whereby the load can be distributed over a greater area of the foundation.

In a central station power plant as generally laid out, the yielding supports are conveniently applied to the condenser, the latter acting as a strut in transmitting the supporting force to the turbine casing. This arrangement has the further advantage that it also provides a support for the condenser permitting expansion thereof due to temperature changes.

Apparatus embodying features of my invention is illustrated in the accompanying drawings, in which:

Fig. 1 is a side elevation of one embodiment of my invention, the foundation being shown in section;

Fig. 2 is a plan view thereof;

Fig. 3 is a detail end elevation as seen from the line III—III of Fig. 1;

Fig. 4 shows a detail of the yielding support;

Fig. 5 is a fragmentary view, partly in section, of a modified form of a yielding support;

Fig. 6 is a side elevation of a modified embodiment in which the yielding supports are applied to the condenser;

Fig. 7 is a plan view of the embodiment shown in Fig. 6; and

Fig. 8 is a detail elevational view of a modified form of yielding support.

Referring now to the drawings in detail, I show a casing or cylinder structure 10 of an elastic fluid turbine. The casing is provided with an admission opening 11 and an exhaust connection 12. A condenser 13 is disposed beneath the turbine at the low-pressure end and secured to exhaust connection 12. The casing is provided on opposite sides with feet 14 and 15, which extend from the low pressure end to a point intermediate the ends. The side feet 14 and 15, at their outer ends as indicated at 16 and 17 rest upon pads or sole plates 18 and 19 positioned on the foundation 20.

A pedestal 21 is provided on the casing at the high pressure end and is slidably mounted on a sole plate 22, rigidly mounted on the foundation. The sole plate 22 has longitudinal guides 23 which permit longitudinal sliding of the pedestal 21 on the sole plate, but prevent lateral movement. The pads 18 and 19 and sole plate 22 provide the three rigid supports, and determine the position of the casing.

Yielding supports for the cylinder structure are applied to the side feet 14 and 15 at their inner ends designated at 24 and 25. The yielding supports are constructed as follows: A lever 26 is fulcrumed on a fulcrum 27 supported on a pedestal 28 forming a part of the foundation. A vertically disposed strut 29 is positioned on the lever 26 near one end thereof and supports one of the ends 24, 25, of the casing feet 14, 15. At the other end of lever 26 and spaced further from the fulcrum than the strut 29, is a heavy counterweight 30. The counterweight 30 exerts a downward gravitational force on its arm of lever 26, causing the other arm of lever 26 to transmit to the casing, through strut 29 and one of the ends 24, 25, a constant force, which is yielding and which does not vary upon relative movement of the foundation and cylinder structure. The counterweight 30 is adapted to slide on the lever 26 so as to vary the force exerted by the other arm of the lever, and may be fixed at the desired point on the lever by a set screw 31.

As shown in Fig. 4, the ends of each strut 29 are rounded, conforming to a sphere which includes both ends. The upper end is positioned in a recess 32 in one of the ends 24, 25, and the lower end is positioned in a recess 33 in the end of lever 26. The recesses 32 and 33 are formed with plane surfaces at their bottom. This arrangement allows rocking of strut 29 upon movement of the turbine casing, and permits free lateral and longitudinal movement of the turbine casing with respect to the yielding support.

The coupling or low pressure end of the casing is anchored against longitudinal and horizontal lateral movement by a king pin 34, rigidly secured to a sole plate or directly to the foundation, and extending upwardly through an opening in a foot or lug 35 on the turbine casing. The king pin 34 and lug 35 permit vertical movement of the casing at this point. It will therefore be seen that the center line of the turbine casing is maintained by lug 35 and pin 34 at one end and by the pedestal 21 and guides 23 at the other end.

The casing is free to expand in all directions upon increase in temperature. The sliding pedestal 21 provides for longitudinal expansion, the lug 35 and pin 34 permit vertical movement, and the feet 14 and 15 can slide laterally as well as longitudinally on the pads 18 and 19. The floating strut 29 permits lateral and longitudinal movement with respect to the yielding supports.

The operation of this embodiment of the invention is as follows: The weight of the casing is distributed among the five supports. It might be distributed approximately equally or the fixed supports may take greater portions of the load. The yielding supports will always exert the same force. Upon movement of the foundation or casing the lever 26 may be moved but the force exerted will not be varied. Movement of one of the fixed supports will change the position of the casing. Such a movement of the casing, however, will not disturb distribution of its weight, inasmuch as the casing will merely turn about the other two fixed points as a pivot, and the load of the yielding supports is constant as explained. It will therefore be apparent that no amount of distortion of either the foundation or the casing can disturb the distribution of the weight of the casing.

While I have shown the yielding supports in the form of counterweights in the above described embodiment, it will be apparent that any other equivalent form of yielding support may be used. Springs would obtain substantially the object of the invention notwithstanding their variation in pressure due to deflection, as their elastic scale can be made sufficiently low to reduce the variation in load resulting from distortion of foundation or expansion of parts to an acceptable minimum.

I have, therefore, shown in Fig. 8, a spring 42 interposed between the end 24 of the casing foot 14 and the pedestal 28. Upon relative movement of the casing and the foundation, the deflection of the spring is slightly changed, but not enough to change the load distribution to an objectionable degree.

In Fig. 5 I have shown a modified form of counterweight and lever which may be used where it is desirable to place the counterweight on a floor below the floor in which the turbine is supported. In this case the lever 26 is bolted to the pedestal 28 and has one end bolted to the strut 29. Inasmuch as relative movement of the lever is small, it is taken care of by looseness or play between the parts. The strut 29 extends downwardly through the opening 36 in the floor 37.

In Figs. 6 and 7 I have shown the yielding support applied to the condenser 13. The rigid supports are the same as in the embodiments already described. Each yielding support consists of a lever 38 fulcrumed on a pedestal 40 and carrying a set of counterweights 41 at the end of the long arm. The short arm of lever 38 rests against the foot 39 secured on the condenser near the bottom thereof. The condenser in this case acts as a strut, being the equivalent of strut 29 in the embodiment first described. This arrangement has the advantage that expansion of the condenser is taken care of. The general lay-out of a central station power plant also makes this arrangement more easy of application.

I am aware that it has been suggested to apply a lever and counterweight to a condenser, to support the condenser and provide for expansion of the condenser due to temperature changes without disturbing the support of the condenser. My invention, however, while attaining these objects, is intended primarily for supporting the turbine casing or cylinder structure, and the counterweights and levers 38 are so designed that a force will be transmitted to the condenser which is considerably in excess of the gross weight of the condenser. By gross weight of the condenser, I mean the weight of the condenser together with the weight of the circulating water and auxiliaries, such as pumps, and any other parts which may be supported by the condenser. The condenser will transmit the excess force to the casing and this force will support a substantial portion of the weight of the turbine. The yielding supports in this case provide supports for both the condenser and a substantial portion of the weight of the turbine.

While in the present embodiments I have illustrated the cylinder structures as embodying rotor bearings, so that my novel supporting means also supports the rotors, it will be apparent that the bearings and rotors may be supported in any suitable manner known to the art.

While I have described my supporting structure as being composed essentially of a three-point suspension in combination with an intermediate flexible supporting member, and while such an arrangement provides an ideal form of support for the reasons heretofore stated, nevertheless, it is obvious that my invention is equally applicable to any other form of turbine supporting structure wherein the flexible supporting means may be interposed between adjacent rigid supporting members in order to materially reduce the deflection and at the same time not interfere with the expansion and contraction of the turbine cylinder.

I have described my invention in connection with the casing of an elastic fluid turbine, inasmuch as it is particularly applicable thereto. It will be apparent that this supporting structure may be used for other bodies which it might be found desirable to support without distortion.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In combination with a turbine cylinder structure having a high pressure end and a low pressure end, a supporting structure therefor comprising three and only three unyielding or rigid supports, two of said supports being at the low pressure end on opposite sides of the cylinder structure and the third being at the high pressure end and on the longitudinal center of the turbine, and a yielding support intermediate the high pressure and low pressure ends exerting a constant upward force on the cylinder structure.

2. In combination, a foundation, a turbine cylinder structure having a high pressure and a low pressure end and resting upon the foundation at three and only three points, one point being at the high pressure end and the other two being at the low pressure end on opposite sides of the cylinder structure, a fulcrum supported from the foundation, a lever fulcrumed on said fulcrum, means for applying a constant gravitational force to said lever, and means for transmitting from said lever to the cylinder structure intermediate the ends thereof a constant force resulting from said gravitational force and acting upwardly on the cylinder structure.

3. The combination defined in claim 2 wherein there is a lever and fulcrum on each side of the cylinder structure.

4. In combination, a foundation, a turbine cylinder structure having a high pressure and a low pressure end and resting upon the foundation at three and only three points, one point being at the high pressure end and the other two being at the low pressure end on opposite sides of the cylinder structure, a condenser secured to and depending from the cylinder structure, a fulcrum supported from the foundation, a lever fulcrumed on said fulcrum, means for applying a constant gravitational force to said lever, and means including the condenser for transmitting from said lever to the cylinder structure intermediate the ends thereof a constant force resulting from said gravitational force and acting upwardly on the cylinder structure.

In testimony whereof, I have hereunto subscribed my name this fifteenth day of November, 1926.

ROBERT C. ALLEN.